United States Patent
Kelch et al.

(10) Patent No.: US 7,556,381 B2
(45) Date of Patent: Jul. 7, 2009

(54) METHOD FOR PRODUCING A LENS AND A LENS PRODUCED THEREBY

(76) Inventors: Gerhard Kelch, Egerlandstr. 62, D-73431 Aalen (DE); Timo Kratzer, Bischof-Fischer-Strasse, D-73430 Aalen (DE); Markus Welscher, Crufessstrasse 1, D-73430 Aalen (DE); Helmut Wietschorke, Spitzwegstrasse 10, S-73433 Aalen-Wasseralfingen (DE)

( * ) Notice: Subject to any disclaimer, the term of this patent is extended or adjusted under 35 U.S.C. 154(b) by 0 days.

(21) Appl. No.: 10/529,246

(22) PCT Filed: Oct. 2, 2003

(86) PCT No.: PCT/EP03/10955
§ 371 (c)(1), (2), (4) Date: Mar. 24, 2005

(87) PCT Pub. No.: WO2004/034129
PCT Pub. Date: Apr. 22, 2004

(65) Prior Publication Data
US 2005/0259222 A1    Nov. 24, 2005

(30) Foreign Application Priority Data
Oct. 4, 2002   (DE)   ............................ 102 46 324

(51) Int. Cl.
A61B 3/00   (2006.01)
G02C 7/02   (2006.01)

(52) U.S. Cl. ........................................ 351/246; 351/177
(58) Field of Classification Search ................. 351/159, 351/176–177, 161, 168, 246
See application file for complete search history.

(56) References Cited

U.S. PATENT DOCUMENTS 1,356,670 A    10/1920   Tillyer
3,722,986 A *   3/1973   Tagnon ........................ 351/176

(Continued)

FOREIGN PATENT DOCUMENTS

CN    1196994 A    10/1998

(Continued)

*Primary Examiner*—Alicia M Harrington
(74) *Attorney, Agent, or Firm*—Wells St. John P.S.

(57) ABSTRACT

In a method for producing a lens, in particular a spectacle lens, central aberrations of an eye, to be corrected, of an ametropic person, such as sphere, cylinder and axis, are compensated. At least one refracting surface of the lens is configured such that for at least one direction of view both a dioptric correction of the ametropia is performed and aberrations of higher order are corrected. Their effects on the visual acuity and/or the contrast viewing are a function of the size of the pupillary aperture of the eye to be corrected and are corrected by the lens.

22 Claims, 3 Drawing Sheets

U.S. PATENT DOCUMENTS

| | | | |
|---|---|---|---|
| 4,925,518 A | 5/1990 | Wasserman et al. | 156/295 |
| 4,957,506 A | 9/1990 | Mercier | 623/6 |
| 5,380,387 A | 1/1995 | Salamon et al. | 156/154 |
| 5,777,719 A | 7/1998 | Williams et al. | 351/212 |
| 6,123,422 A * | 9/2000 | Menezes et al. | 351/177 |
| 6,224,211 B1 | 5/2001 | Gordon | 351/177 |
| 6,454,408 B1 * | 9/2002 | Morris et al. | 351/177 |
| 6,511,180 B2 * | 1/2003 | Guirao et al. | 351/211 |
| 6,554,425 B1 * | 4/2003 | Roffman et al. | 351/177 |
| 6,616,275 B1 | 9/2003 | Dick et al. | 351/212 |
| 6,786,602 B2 * | 9/2004 | Abitbol | 351/246 |
| 6,836,371 B2 * | 12/2004 | Lai et al. | 359/642 |
| 2002/0118337 A1 * | 8/2002 | Perrott et al. | 351/159 |
| 2002/0196412 A1 * | 12/2002 | Abitbol | 351/246 |

FOREIGN PATENT DOCUMENTS

| | | |
|---|---|---|
| DE | 10024080 | 5/2000 |
| DE | 19954523 A1 | 9/2001 |
| EP | 0472291 A1 | 7/1991 |
| EP | 1262815 A2 | 12/2002 |
| EP | 0663179 A1 | 1/2005 |

* cited by examiner

Spherical aberration in dpt

METHOD FOR PRODUCING A LENS AND A LENS PRODUCED THEREBY

CROSS REFERENCE TO RELATED APPLICATION

This is a 35 U.S.C. §371 application of and claims priority to PCT International Application Number PCT/EP 03/010955, which was filed 2 Oct. 2003, and was published in German, and which was based on German Patent Application No. 102 46 324.7, filed 4 Oct. 2002, and the teachings of the applications are incorporated herein by reference.

BACKGROUND OF THE INVENTION

1. Field of the Invention

The invention relates to a method for producing a lens, in particular a spectacle lens, central aberrations of an eye, to be corrected, of an ametropic person, such as sphere, cylinder and axis, being compensated. The invention also relates to a lens that is produced using the method.

2. Description of the Related Art

Ametropias of eyes are generally corrected with the aid of spectacle lenses or contact lenses, in order to increase the visual acuity. For this purpose, the refracting values, such as sphere, cylinder and axis, of the spectacle lens or the contact lens that are optimum for raising visual acuity are determined in a subjective or objective measuring method. These data are then incorporated in a known way into a spectacle lens having two refracting surfaces, in which case the surface averted from the eye is generally a spherical surface and, given the presence of an astigmatism, the surface facing the eye is a toric surface rotated in front of the eye in accordance with the axial position.

Aberrations occurring in the case of a lateral view through a spectacle lens are reduced by using aspheric and atoric surfaces, aspheric and atoric surfaces constituting surfaces that deviate from a sphere or a torus, respectively. The use of such surfaces for reducing aberrations has already been practiced for a long time. Likewise known are irregularly shaped surfaces, so-called freeform surfaces, which are used, in particular in the case of progressive lenses, to achieve the rise in power in the near zone in order to support the accommodation. The production of such surfaces with the aid of CNC-controlled grinders, millers and polishing machines is likewise known from the prior art.

Furthermore, refractive measuring methods such as wavefront detection, are known that not only permit the values, already mentioned above, of sphere, cylinder and axis to be determined, but also aberrations of higher order over and above this. These aberrations are a function of the aperture of the eye pupil.

The size of the pupillary aperture is influenced, inter alia, by the brightness of the surroundings, medicaments, and the age and healthiness of the person being examined. In healthy adults, the pupillary aperture fluctuates between 2.0 mm and 7.0 mm. The pupillary aperture is smaller in daylight than in twilight or at night.

A refractive measuring method is known from EP 663 179 A1. The document describes a method with the aid of which refractive measurements can also be undertaken on an eye provided with a contact lens. Measurements are undertaken at different points of the contact lens/eye system. In a first step, a light beam is generated whose light source is selected from a group that comprises a plurality of point light sources and slit-shaped light sources. Thereafter, this light beam is guided directly into the eye onto the retina, and the light beam is reflected starting from there. The reflected light beam therefore strikes a scanning aperture. The passage of light through the scanning aperture is picked up by a camera, which generates an image signal. This signal is displayed on a monitor. The method and the device, as well, are of substantial use for measuring optical defects, deformations or aberrations of an eye.

Furthermore, DE 199 54 523 discloses a production method for contact lenses, the first step being to use a so-called wavefront detection method to determine the optical ametropia of an eye, and a soft contact lens being mounted on the cornea. The refractive measurement is carried out with the contact lens seated, a material removal method supported by laser radiation thereafter being applied on the contact lens separated from the eye. Owing to the removal of material supported by the laser, the contact lens assumes a surface shape by means of which a surface power that is determined by the optical correction data is obtained in the contact lens. Furthermore, information relating to the surface topology of the eye is obtained, and is likewise also incorporated into the correction.

U.S. Pat. No. 6,224,211 discloses a method that, in addition to the correction of the normal atropia, also permits a correction to the spherical aberration of the eye. Various aspheric contact lens that are designed for zero spherical and astigmatic action are mounted on the eye in each case. These lenses are used to determine how the spherical aberration of the eye can be corrected as best as possible. This information is used to determine an aspheric lens, which permits the optimal correction of the visual acuity and is matched to the patient.

Finally, DE 100 24 080 A1 discloses a method with which the complete correction of ametropias of the human eye is to be possible, a wavefront analysis device being used for this purpose. The substance of the aim here is a surgical correction of the eye itself. The dependence of the pupillary aperture on the aberrations of higher order is not taken into account.

The size of the pupillary aperture is 3.0 mm to 3.5 mm in daylight for healthy middle aged adults. With increasing age it decreases to approximately 2.0 mm to 2.5 mm. Since the size of the pupillary aperture can enlarge up to 7.0 mm as darkness grows, the effects of errors of higher order change as a consequence.

SUMMARY OF THE INVENTION

It is therefore an object of the invention to create an alternative method that permits a spectacle lens to be produced such that the optical surfaces of a lens can be configured in such a way that aberrations of higher order are substantially reduced, and thereby a spectacle lens is produced that permits maximum visual acuity.

According to the invention, this object is achieved by configuring at least one refracting surface of the lens such that for at least one direction of view both a dioptric correction of the ametropia is performed and aberrations of higher order whose effects on the visual acuity and/or contrast viewing are a function of the size of the pupillary aperture of the eye to be corrected, are corrected by the lens.

Aberrations of higher order that are a function of the papillary aperture are chiefly the spherical aberration, astigmatisms of higher order, the coma, and the trefoil (three leaf clover) aberration. These are deviations from the ideal paraxial image. It is understood as regards spherical aberration that incoming paraxial beams strike the lens at different heights of incidence, and so the paraxial beam cuts the optical axis at the focal point F', while the beams incident at finite heights have other intercept distances.

Coma is generally understood as the aberration which occurs in the case of the imaging of off-axis object points by beams with a large aperture angle, and in which spherical aberration and astigmatism are superimposed and which is proportional to the object—and the square of the pupil height to a third order approximation. What results in this case is an unsymmetrical aspheric comet-type scattering figure whose tail respectively points away from or to the optical axis in the case of external or internal coma, and a corresponding point image spread function having only partially formed diffraction rings. Trefoil aberration is understood as an aberration of higher order that generates via a wave aberration a three-way point image spread function with a definition brightness. The trefoil aberration is superimposed on the coma of 3rd order and remains as residual aberration if only the imaging of the meridional and sagittal rays are corrected. This gives rise to three-way stars as image points.

Refractive measuring methods such as, for example, the wavefront detection method are used to determine the refraction values of the ametropic eye, which means that the sphere, the cylinder, and the axis are determined. Moreover, this method can be used to carry out transmitted-light measurements through the cornea, the eye lens and the vitreous humor and thereby the aberrations; of higher order that are a function of the pupillary aperture are determined. The result includes the aberrations that arise from the combination of the optical effects of cornea, eye lens, vitreous humor and pupillary aperture.

The information obtained can thus be incorporated into at least one refracting surface, chiefly the rear surface of the spectacle lens, by using the methods of calculation and production corresponding to the prior art.

A spectacle lens is thus designed that, in addition to the errors previously correctable, which are described by the paraxial values of sphere, cylinder, axis, also compensates those which are a function of the aperture of the pupil. As a result, spectacle lenses that offer the spectacle wearer a substantially higher visual acuity for at least one direction of view are created for ametropic and for emmetropic (correctly sighted) persons. The best possible visual acuity is therefore provided not only by a correction to the paraxial values, but also by a correction to the aberrations of higher order.

It can be provided in an advantageous way that the region of the highest visual acuity is formed by introducing at one aspherical surface.

The design of the region of most acute vision as an asphere is very advantageous by virtue of the fact that this refracting surface deviates from a spherical surface. The lens curvature thus differs from a spherical surface, axially remote beams being refracted more weakly or more strongly than in the case of the use of a spherical surface, and it thereby being possible to reunite the light beams at a focal point F'.

Exemplary embodiments of the invention are explained in more detail below with the aid of the drawings.

DETAILED DESCRIPTION

Figure 1:
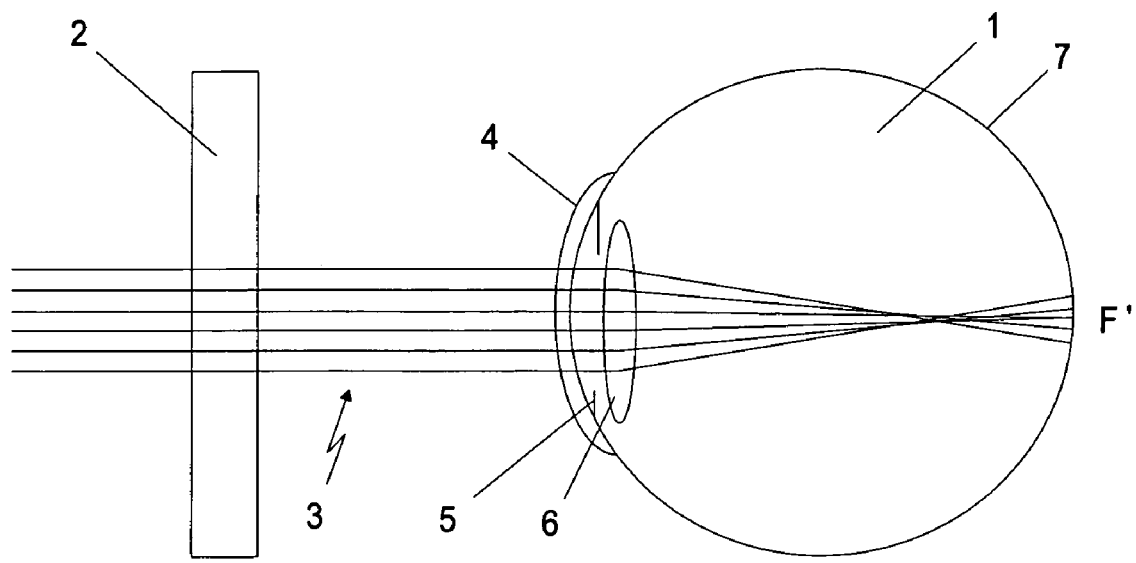
FIG. 1 shows an illustration of the principle of a beam bundle in the case of uncorrected spherical aberration.

FIG. 1 shows the system of an eye 1 in conjunction with a lens 2. The lens 2 is preferably a spectacle lens, but it can, of course, also be a contact lens or an intraocular lens. The lens 2 can be formed from glass and/or plastic. It is also possible to provide for different lenses 2, for example contact lens and spectacle lens, to be combined with one another so as to correct the ametropias. The light beams 3 emanating from an object (not illustrated here) transit the optical system of spectacle lens 2 and reach through a cornea 4, an eye pupil 5 and an eye lens 6 to the retina 7 of the eye 1. Located on the retina 7 is a fovea of the eye 1 at which the greatest density of the photoreceptors prevails. Ideally, all the optical information should be directed into the fovea. This means that the fovea on the retina 7 constitutes a focal point F' at which the light beams 3 should intersect at a point. However, this is achieved only for small pupillary apertures. Because of the spherical aberration occurring with every eye 1, not all the light beams 3 that transit the eye lens 6 are united at the focal point F' or in the fovea on the retina 7. The beams 3 incident further toward the edge of the pupil 5 cut the retina 7 generally at points further removed from the ideal intersection point F'.

Since what is involved here is the correction of in principle any eye, that is to say also the correctly sighted (emmetropic) eye, the lens 2 in the depiction of FIG. 1 is illustrated only as a drawing of the principle.

In order to remove the spherical aberration, it is firstly necessary to obtain specific information on the ametropic eye 1. Use is made for this purpose of the wavefront detection method, which operates by using a wavefront aberrometer, for example a Hartmann-Shack sensor.

Figure 2:
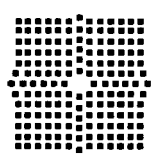
FIG. 2 shows an illustration of the principle of a projected original pattern.
Figure 3A:
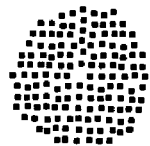
FIGS. 3a and 3b show illustrations of the principle of a reflected profile with distortions.
Figure 3B:
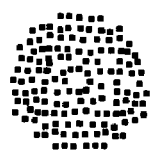

A pattern of individual light beams that is illustrated in FIG. 2 is imaged onto the retina 7. A distorted image of the incoming light bundle 3 owing to the aberrations of the eye 1 is produced on the retina 7. An integrated CCD camera, which is installed coaxially with the incident beam 3, picks up the distorted image at a very small solid angle at which the image is defined free from aberrations. An offline program calculates the aberrations with the aid of a desired/actual comparison of the relative positions of the incident partial beams 3 in relation to the relative positions of the points produced on the retina 7. Thereafter, the aberrations are described mathematically by coefficients of Zernike polynomials and are represented as a height profile. The profiles reflected in FIGS. 3a and 3b are provided with two different distortions of the original pattern. FIG. 3a shows a less distorted profile with reference to FIG. 3b.

Figure 4:
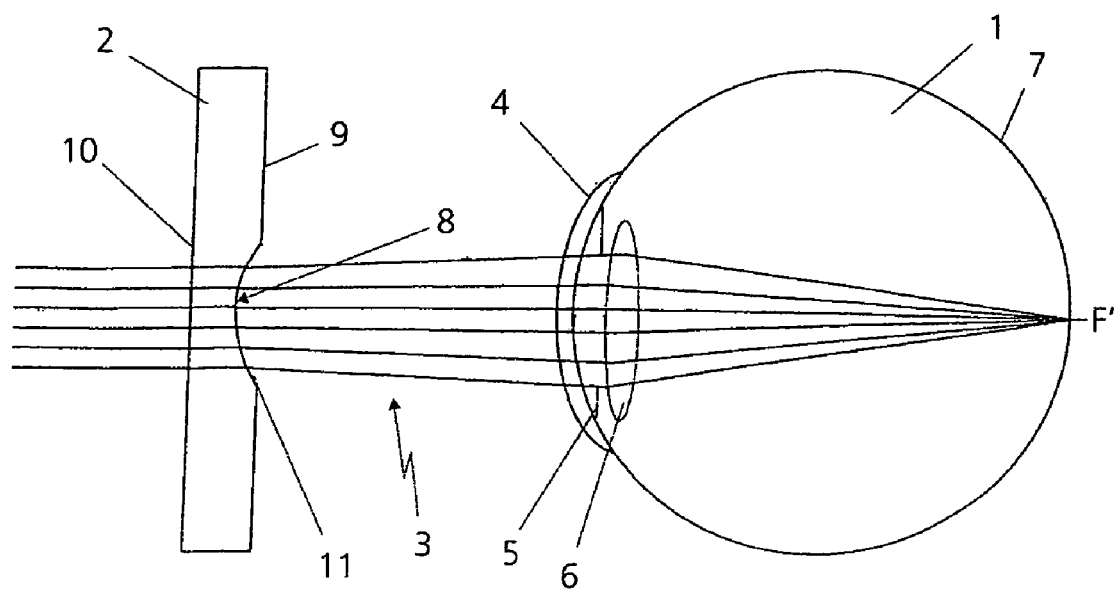
FIG. 4 shows an illustration of the principle of a beam bundle in the case of corrected spherical aberration.

The system of an eye in conjunction with a lens 2 with corrected spherical aberration is illustrated in FIG. 4.

The measurement of the eye 1 with the aid of a wavefront detection method yields an accurate conclusion about the imaging properties of the eye 1 and, in particular, about the aberrations which are a function of the pupillary aperture 5. In order to determine the imaging properties of the eye 1 or the paraxial values of sphere, cylinder, axis of the eye 1, it is possible to use any designed unit that can supply the wavefronts specifically required here.

Of course, the paraxial values can also be determined via a refractive measurement or with the aid of skiaskopy. These values can be determined by an optician or by an ophthalmologist, for example. Skiaskopy is understood as a manual method for objectively determining the refraction of the eye. In this case, the directions of movement of light phenomena (secondary light source) are observed on the retina of the subject's eye and conclusions are derived therefrom regarding the ametropia.

Likewise, the size of the pupillary aperture 5 is determined by means of the wavefront detection method for the purpose of correcting the aberrations of higher order. Since the pupillary aperture 5 for daylight deviates clearly from that for twilight, it follows that the visual acuity of a person can also change. It can therefore be expedient to adapt to such a person first lenses 2 for correcting the ametropia by day, and further lenses 2 for correcting the ametropia in twilight. If appropriate, it is also possible if required to adapt further lenses 2, for example for seeing in twilight, as a function of the pupillary aperture 5 and the visual acuity determined in this case.

The information obtained is used via appropriate optical calculations for the purpose of modifying at least one surface of the lens 2, this exemplary embodiment referring to a rear surface or an eye-side surface 9 of the lens 2, in the surroundings of a viewing point 8 such that the ideal union, already described above, of the light beams 3 is realized at the fovea of the retina 7. The eye 1 is measured without the lens 2, a deformed wavefront being produced. In order to remove the spherical aberration, a wavefront should be produced that is formed oppositely to the already existing wavefront. The information of the opposite wavefront is introduced into the lens 2 on the rear surface 9 in the surroundings of the viewing point 8 in such a way that at least one aspheric surface is produced.

Here, aspheric surface is understood, in particular, as the section from a rotationally symmetrical surface that differs, however, from the spherical shape. Thus, as a result of the configuration of the asphere, the light beams 3 intersect at a focal point F' of the fovea on the retina 7. The spherical aberration is thereby removed. Depending on the targeted improvement of the visual acuity, the surface can likewise be an atoric surface or a freeform surface.

An atoric surface denotes a section from a surface that has two mutually perpendicular principal sections of different curvature, and in the case of which the section through at least one of the main sections is not circular.

A free form surface is to be understood as an asphere that is neither rotationally symmetrical nor axially symmetrical.

The correction of the spherical aberration, also termed aperture aberration, of the eye 1 can likewise take place with the same action on a surface 10, averted from the eye 1, of the lens 2. Corrections can likewise be realized on both surfaces 9 and 10 of the lens 2.

A correction of the spherical aberration is basically possible for all shapes of lenses, in particular all shapes of spectacle lenses. In the case of single-vision lenses, and also of single-vision lenses with prismatic action, the spectacle lens 2 is modified in the surroundings of the viewing point 8 by inserting an asphere.

Particularly in the case of spectacle lenses, the number of dioptric actions are used to distinguish between double-vision lenses (bifocal lenses) and triple-vision lenses (trifocal lenses). The two parts of the double-vision lens, that is to say the distance-vision part and reading area, have a different refractive power and are intended, in particular, for presbyopes, who require both a lens for the far distance and one for the near distance. If the reading area is further split into a part for the reading distance and one for middle distance having, for example, half the action of the full reading area, a triple-vision lens is spoken of, that is to say a lens having three actions.

In the case of bifocal lenses, which have a fused reading area, the separation surface between the main lens and the material of the reading area can be appropriately configured. In this case, an asphere is inserted once in the distance-vision part and once in the reading area. The transition of the region of maximum visual acuity 8 into the normal region of the spectacle lens 2 of slightly reduced visual acuity can be performed either abruptly at an edge or else by a soft or smooth transition. Progressive lenses are used for such a smooth transition.

A progressive lens is understood as a spectacle lens 2 having a non-rotationally symmetrical surface with a continuous change in the focusing action over a part of the entire area of the spectacle lens 2. In order to correct the spherical aberration in the case of progressive lenses, the surroundings of the two viewing points for the far distance and the near distance are thereby respectively modified. It is also possible, if desired, for the progression zone to be incorporated.

Figure 5:
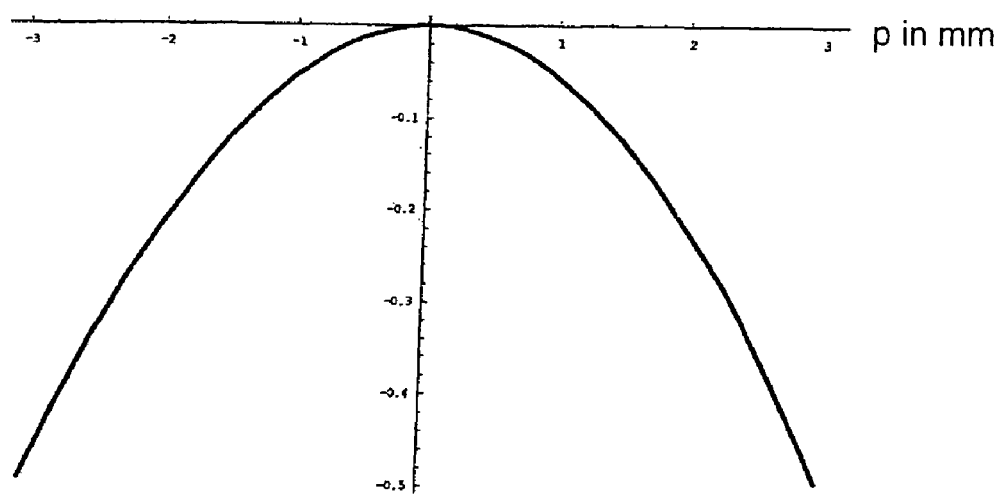
FIG. 5 shows a depiction of the uncorrected spherical aberration of an eye.

FIG. 5 shows the spherical aberration of a normally seeing (emmetropic) eye 1 as a function of the pupil radius p. It is to be seen that the spherical aberration is correlated with the magnitude of the pupil diameter p. This means that the spherical aberration also grows as the pupil 5 becomes larger. In this exemplary embodiment, the pupil diameter p has a magnitude of 6 mm. For beams 3 in the vicinity of the edge of the pupil, the eye 1 is myopic with an ametropia of −0.5 dpt. For a pupil diameter p of 2 mm, the spherical aberration is approximately −0.075 dpt. The aberration of higher order or the spherical aberration is assumed in the exemplary embodiment to be rotationally symmetrical over the pupil 5, and can therefore be represented by its cross section.

Figure 6:
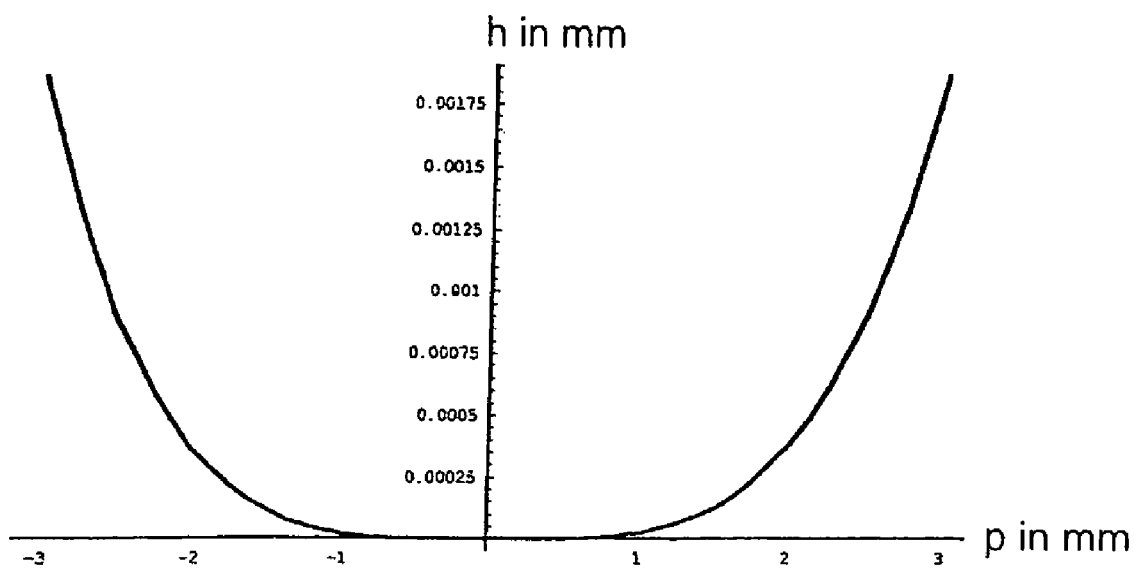
FIG. 6 shows an exemplary depiction of an illustration of the correction of the spherical aberration.
Figure 7:
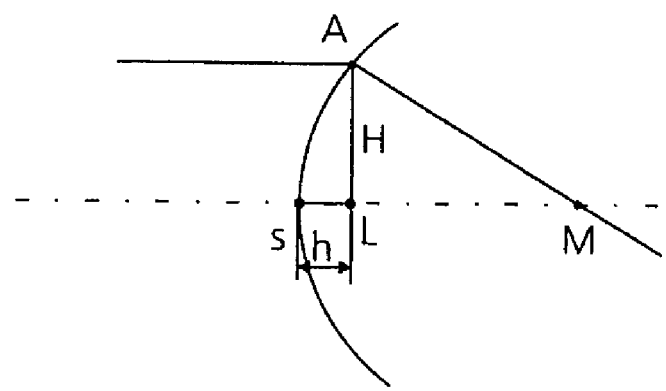
FIG. 7 shows an illustration of a sagitta h, which is defined as the distance between a vertex S of a spectacle lens and a. nadir point L on an optical axis.

FIG. 6 illustrates the sagitta h of the correction of the spherical aberration as a function of the pupil diameter p for a spectacle lens 2 of 0 dpt bending and the refractive index n=1.6. If point A is the point of incidence of a beam striking a curved refracting surface at the height H, then a sagitta h is denoted by the spacing between the vertex S of the curved refracting surface and the nadir point L of the perpendicular to the optical axis throuah point A (FIG. 7). This exemplary embodiment illustrates which correction must be applied to the eye-side surface 9 of the spectacle lens 2, which is illustrated in FIG. 4, in order to correct the spherical aberration described in FIG. 5. It is easy to see that what is involved in this case is a surface deviating from the spherical shape, that is to say an aspheric surface.

The lens 2 has refractive and/or diffractive structures in at least one refracting surface that serves the purpose of dioptric correction of an ametropia, and of the correction of at least one aberration of higher order for at least one direction of view. It is preferred to provide only one surface 9 or 10 of the lens 2, in particular of the spectacle lens, with such structures. This surface 9 or 10 preferably has only refractive structures. Diffractive structures can be used, for example, for contact lenses and spectacle lenses. Thus, very many concentrically arranged rings in microscopically fine steps can be provided on the rear of a contact lens. These "grooves" cannot be seen or perceived with the naked eye. However, they fill up with tear liquid. Together, these two structures produce a division of the light in addition to a refraction of the light. A lens 2 is thus created which has a multiple-vision action with a transferring depth of focus. Visual impressions from near to far can be imaged on the retina 7 simultaneously and with differing sharpness.

The spherical aberration, but also any other aberration of higher order, can thereby be substantially reduced or removed by the use of aspheric surfaces. At least 50%, preferably 75%, of the errors of higher order can be compensated solely by correcting the central aberrations, such as sphere, cylinder and axis. It would also be conceivable for the aberrations of higher order to be compensated by correction measures such as, for example, applying an appropriately calculated correcting surface (asphere, atorus or free form surface) to at least one refractive surface 9 and/or 10 of the lens 2, preferably of the spectacle lens. However, it was also possible to establish that a correction of the spherical equivalent (sph+zyl/2), for example, is generally already sufficient for also compensating at least 50% of the spherical aberration.

At least 50%, preferably 85%, of the spherical aberration can be compensated solely by the correction of the central aberrations. The number of the parameters needing to be taken into account when producing lenses, in particular spectacle lenses, can thereby be reduced to the central aberrations. Consequently, it is possible to replace relatively complex surfaces, for example free form surfaces, by simple structured surfaces, for example a rotationally symmetrical aspheric surface, and this simplifies the production.

What is claimed is:

1. A method for producing a lens, comprising:
    providing a lens to correct aberrations of an eye of an ametropic person; and
    modifying a surface of the lens to correct aberrations of lower order, wherein the modifying further corrects a percentage of at least one aberration of higher order; and
    wherein the modifying comprises providing at least one refracting surface of the lens that performs dioptric correction of the ametropia and performs correction of the at least one aberration of the higher order for at least one direction of view, and wherein the percentage of the at least one aberration of higher order is compensated by correcting only central aberrations.

2. The method as claimed in claim 1 further comprising another modifying of at least a portion of the same surface of the lens to increase the percentage of correction of the at least one aberration of higher order.

3. The method as claimed in claim 1, wherein a spherical aberration is corrected as the at least one aberration of higher order.

4. The method as claimed in claim 1, wherein a coma is corrected as the at least one aberration of higher order.

5. The method as claimed in claim 1, wherein a trefoil aberration is corrected as the at least one aberration of higher order.

6. The method as claimed in claim 1, wherein values required for correcting at least one of the lower and higher aberrations are determined by measuring visual acuity by implementing at least one of the following methods: by determining refraction; by measuring a wavefront; and by skiaskopy.

7. The method as claimed in claim 6, wherein said wavefront is measured with a Hartmann-Shack sensor.

8. The method as claimed in claim 1, wherein a size of a pupillary aperture of the eye is determined for correcting said aberrations, in particular said aberrations of higher order.

9. The method as claimed in claim 1, wherein at least 50% of the at least one aberration of higher order is compensated solely by a correction of said aberrations of lower order such as sphere, cylinder and axis.

10. The method as claimed in claim 1, wherein at least 85% of the at least one aberration of higher order is compensated solely by a correction of said aberrations of lower order comprising at least one of: sphere, cylinder and axis.

11. The method as claimed in claim 1, wherein a region of highest visual acuity is formed by introducing at least one aspheric surface.

12. The method as claimed in claim 1, wherein a region of highest visual acuity is formed by introducing at least one atoric surface.

13. The method as claimed in claim 1, wherein a region of highest visual acuity is formed by introducing at least one free form surface.

14. The method as claimed in claim 1, wherein a region in said lens is corrected for an infinite object distance.

15. The method as claimed in claim 1, wherein a region in said lens is corrected for a finite object distance.

16. The method as claimed in claim 1, wherein a transition of a region with highest visual acuity into a region with slightly reduced visual acuity is performed via an edge.

17. The method as claimed in claim 1, wherein the dioptric correction occurs in the same method step as the correction of the at least one aberration of the higher order.

18. The method as claimed in claim 1, wherein at least 75% of the at least one aberration of higher order is compensated solely by a correction of said aberrations of lower order such as sphere, cylinder and axis.

19. A method for producing a lens, comprising:
    providing a spectacle lens wherein central aberrations of an eye to be corrected of an ametropic person, such as sphere, cylinder and axis, are compensated, wherein at least one refracting surface of said lens is configured in a way that for at least one direction of view, both a dioptric correction of the ametropia is performed and aberrations of higher order whose effects on the visual acuity and/or contrast viewing are a function of a size of a pupillary aperture of said eye to be corrected, are corrected by said lens; and
    wherein at least 50% of said aberrations of higher order are compensated solely by a correction of said central aberrations such as sphere, cylinder and axis.

20. The method as claimed in claim 19, wherein at least 85% of said aberrations of higher order are compensated solely by a correction of said central aberrations comprising at least one of: sphere, cylinder and axis.

21. The method as claimed in claim 19, wherein the size of the pupillary aperture of the eye is determined for correcting said aberrations, in particular said aberrations of higher order.

22. The method as claimed in claim 19, wherein at least 75% of said aberrations of higher order are compensated solely by a correction of said central aberrations such as sphere, cylinder and axis.

* * * * *

UNITED STATES PATENT AND TRADEMARK OFFICE
CERTIFICATE OF CORRECTION

PATENT NO.         : 7,556,381 B2                                    Page 1 of 1
APPLICATION NO.    : 10/529246
DATED              : July 7, 2009
INVENTOR(S)        : Gerhard Kelch et al.

It is certified that error appears in the above-identified patent and that said Letters Patent is hereby corrected as shown below:

Column 2, line 61 – Replace "papillary" with --pupillary--.

Column 3, line 26 – Replace "aberrations; of" with --aberrations of--.

Column 4, line 6 – Replace "and a. nadir" with --and a nadir--.

Column 6, line 43 – Replace "axis throuah" with --axis through--.

Signed and Sealed this

Twenty-seventh Day of July, 2010

David J. Kappos
*Director of the United States Patent and Trademark Office*